United States Patent
Santy, Jr.

(10) Patent No.: US 6,669,238 B1
(45) Date of Patent: Dec. 30, 2003

(54) LOCKING APPARATUS FOR A BEVERAGE DISPENSER

(75) Inventor: John D. Santy, Jr., San Antonio, TX (US)

(73) Assignee: Lancer Partnership, LTD, San Antonio, TX (US)

(*) Notice: Subject to any disclaimer, the term of this patent is extended or adjusted under 35 U.S.C. 154(b) by 0 days.

(21) Appl. No.: 09/411,456

(22) Filed: Oct. 1, 1999

(51) Int. Cl.[7] .............................................. F16L 27/00
(52) U.S. Cl. ................. 285/124.4; 403/282; 285/124.3; 285/205
(58) Field of Search ................. 285/124.1, 124.3, 285/124.4, 205, 206, FOR 118, 124.5, 124.2; 222/129.1; 403/315, 316, 317, 331, 326, 294, 282, 281, 409.1; 411/539, 541; 24/702, 697.1, 669

(56) References Cited

U.S. PATENT DOCUMENTS

| | | | | |
|---|---|---|---|---|
| 2,204,117 A | * | 6/1940 | Brammer | 474/241 |
| 2,800,242 A | * | 7/1957 | Sauthoff | 220/3.8 |
| 3,162,412 A | * | 12/1964 | McEntire | 285/124.2 |
| 3,512,806 A | * | 5/1970 | Romney et al. | 285/124.4 |
| 4,007,951 A | * | 2/1977 | Legris | 285/124.4 |
| 4,796,896 A | * | 1/1989 | Anderson, Jr. | 285/124.4 |
| 4,881,844 A | * | 11/1989 | Tremblay | 403/315 |
| 5,054,170 A | * | 10/1991 | Otrusina | 24/580.11 |
| 5,352,002 A | * | 10/1994 | Vouillon et al. | 292/155 |
| 5,725,255 A | * | 3/1998 | Hayashi et al. | 285/26 |
| 5,904,325 A | * | 5/1999 | Hung | 248/74.4 |
| 6,098,842 A | * | 8/2000 | Schroeder et al. | 403/282 |

FOREIGN PATENT DOCUMENTS

| | | | | |
|---|---|---|---|---|
| GB | 000772158 A | * | 4/1957 | 285/FOR 118 |
| GB | 2127925 A | * | 4/1984 | 285/FOR 118 |

\* cited by examiner

Primary Examiner—Lynne H. Browne
Assistant Examiner—Aaron Dunwoody
(74) Attorney, Agent, or Firm—Christopher L. Makay

(57) ABSTRACT

A locking apparatus for securing at least one component to an anchoring component piece includes an abutment plate for contact with the anchoring component piece and a plate contactor notch disposed on the abutment plate for contact with at least one component. In particular, the plate contactor notch includes a clutching surface for contact with at least one component. The locking apparatus further includes a slide aperture disposed on said abutment plate for facilitating attachment of the abutment plate to the anchoring component piece. The slide aperture, in turn, includes a slide aperture correction slot for facilitating resilient displacement of the abutment plate as well as includes a slide aperture mounting slot for receiving a mounting screw that attaches the abutment plate to the anchoring component piece. As such, the slide aperture mounting slot facilitates variable positioning of the abutment plate with respect to the anchoring component piece via a ratcheting motion between a receiving position and a locking position, thereby, ultimately, attaching at least one component piece to the anchoring component piece.

36 Claims, 3 Drawing Sheets

LOCKING APPARATUS FOR A BEVERAGE DISPENSER

BACKGROUND OF THE INVENTION

1. Field of the Invention

The present invention generally relates to dispensing equipment, such as a beverage dispenser system, and, more particularly, but not by way of limitation, to a locking apparatus for securing components to dispensing equipment.

2. Description of the Related Art

Beverage dispenser systems dispense a beverage flavored syrup mixed with either plain water to form a drink, such as punch, or carbonated water to form a carbonated drink, such as cola. Each beverage fluid is carried by a separate beverage fluid line from a beverage fluid source to a dispensing nozzle. Often, beverage fluids are then combined by the dispensing nozzle to form a desired drink.

Inasmuch, fittings are commonly provided by beverage dispensers to couple fluid lines to component pieces, such as a dispensing nozzle, valve, or a back block. For example, a port, a fitting, etc. (generally, hereinafter referred to as a "component") is typically linked between each beverage fluid line and a corresponding boss inlet of a dispensing nozzle, thereby facilitating fluid communication as well as providing a leak-proof seal between the beverage fluid line and the corresponding boss inlet. Moreover, because a fluid line is often flexible and, thus, tends to move about with little or no external stimulus, locking devices are commonly provided with each fitting. Locking devices prevent a beverage fluid line from pulling a fitting out from a corresponding anchoring component piece as that fluid line moves about while in operation, thereby securing the fitting to the anchoring component piece.

Although current locking devices operate adequately, it should be emphasized that such devices secure only one component and do not provide for the securing a plurality of components. Accordingly, there is a long felt need for a locking device for optimally securing at least one component to an anchoring component piece over long periods as well as for providing easy removal, replacement, and manufacturing thereof.

SUMMARY OF THE INVENTION

In accordance with the present invention, a locking apparatus for securing at least one component to an anchoring component piece includes an abutment plate for contact with the anchoring component piece and a plate contactor notch disposed on the abutment plate for contact with at least one component. In particular, the plate contactor notch includes a clutching surface for contact with at least one component.

The locking apparatus includes a slide aperture disposed on said abutment plate for facilitating attachment of the abutment plate to the anchoring component piece. The slide aperture includes a slide aperture correction slot extending substantially along the abutment plate for facilitating resilient displacement of the abutment plate along the slide aperture.

A slide aperture mounting slot is provided by the slide aperture for receiving a mounting screw that attaches the abutment plate to the anchoring component piece. As such, the slide aperture mounting slot facilitates variable positioning of the abutment plate with respect to the anchoring component piece via a ratcheting motion between the first mounting slot groove and the second mounting slot groove, each provide by the slide aperture mounting slot.

Thus, in the first mounting slot groove, the locking apparatus is rendered in a receiving position for facilitating linking of at least one component with the anchoring component piece. Similarly, in the second mounting slot groove, the locking apparatus is rendered in a receiving position for facilitating attachment of at least one component with the anchoring component piece.

The locking apparatus may further include an applicator lip extending outwardly from the abutment plate for facilitating ease of movement of the abutment plate as well as for enhancing resiliency of the abutment plate at the slide aperture. It should also be added that the anchoring component piece may include an anchoring component interface element for engagement with the locking apparatus.

The anchoring component interface element includes a boss extending outwardly from the anchoring component interface element for receiving at least one component to secure at least one component to the anchoring component piece. The anchoring component interface element may include a mounting screw boss extending outwardly from the anchoring component interface element for receiving the mounting screw to secure the locking apparatus to the anchoring component piece. A guide rib extending outwardly from the anchoring component interface element and in engagement with the slide aperture correction slot may also be provided for fixing the position of the slide aperture mounting slot with respect to the anchoring component interface element.

In accordance with the present invention, a locking apparatus array for securing at least one component to an anchoring component piece, includes a plurality of locking apparati, whereby each locking apparatus is as described above. In the locking position, a plate contactor notch of one locking apparatus is in cooperative engagement with a plate contactor notch of at least one other locking apparatus such that at least one component is secured to the anchoring component piece.

In accordance with the present invention, a method for securing at least one component to an anchoring component piece includes connecting at least one locking apparatus to the anchoring component piece and rendering at least one locking apparatus in a receiving position. At least one component is thus linked with the anchoring component piece. The method further includes rendering at least one locking apparatus in a locking position as well as securing at least one component to the anchoring component piece via at least one locking apparatus.

It is therefore an object of the present invention to provide a locking apparatus and an associated method for securing at least one component to an anchoring component piece.

It is therefore a further object of the present invention to provide a locking apparatus array and an associated method for securing at least one component to an anchoring component piece.

Still other objects, features, and advantages of the present invention will become evident to those skilled in the art in light of the following.

BRIEF DESCRIPTION OF THE DRAWINGS

FIG. 5 illustrates the preferred manner for securing at least one fitting or other component to an anchoring component piece via at least one locking apparatus according to the example provided in FIG. 3.

DETAILED DESCRIPTION OF THE PREFERRED EMBODIMENT

As required, detailed embodiments of the present invention are disclosed herein, however, it is to be understood that the disclosed embodiments are merely exemplary of the invention, which may be embodied in various forms; the figures are not necessarily to scale; and some features may be exaggerated to show details of particular components or steps.

Figure 1:
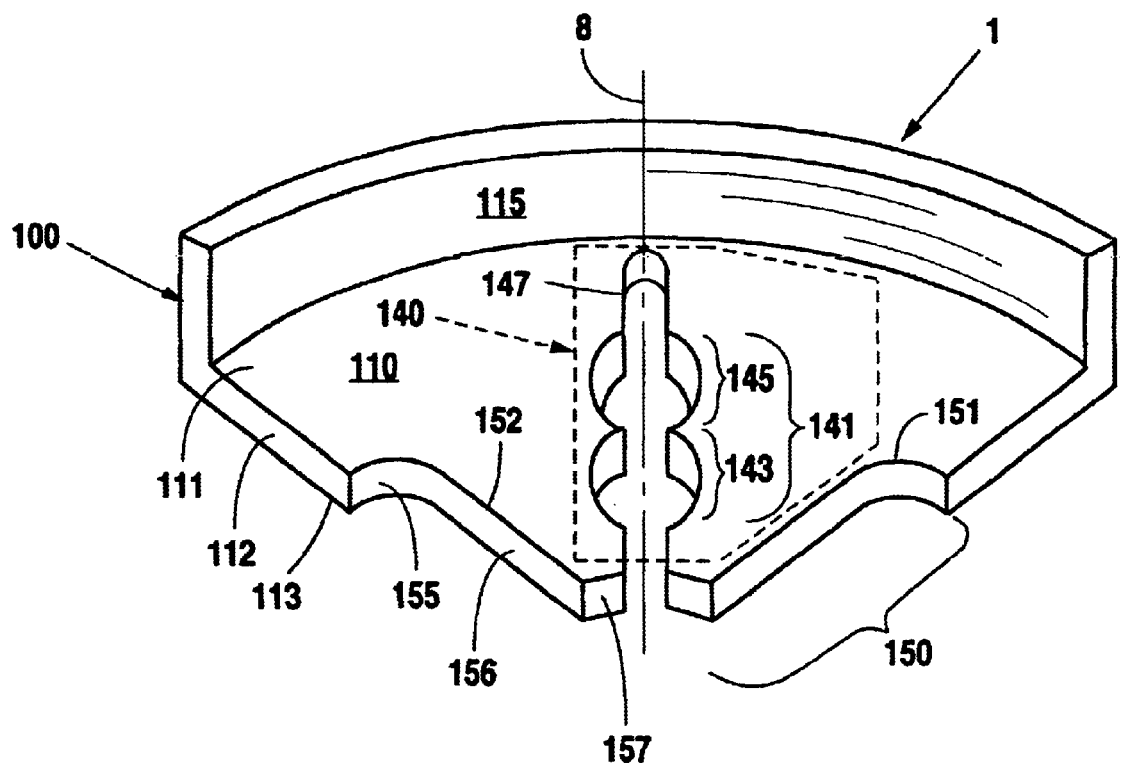
FIG. 1 is a perspective view illustrating a locking apparatus according to the preferred embodiment for securing at least one component to an anchoring component piece.

FIGS. 1–5 illustrate a locking apparatus 1 for optimally maintaining grab about at least one component, such as a port, a fitting, etc. (generally, hereinafter referred to as a "component"), even over long operational cycles. The locking apparatus 1 includes an abutment plate 110 defining a depth 112. As shown in FIG. 1, the abutment plate 110 further defines a first surface 111 and a second surface 113, whereby the second surface 113 preferably contacts an anchoring component piece 5.

Inasmuch, the abutment plate 110 includes at least one slide aperture 140 preferably formed along the depth 112, ultimately, for facilitating the attachment of at least one component to the anchoring component piece 5. Although those of ordinary skill in the art may contemplate alternate positioning of the slide aperture 140, FIG. 1 shows the slide aperture 140 preferably disposed along an axis of symmetry 8 of the abutment plate 110.

The slide aperture 140 includes a slide aperture mounting slot 141 disposed along the depth 112 and, preferably, along the axis of symmetry 8 for receiving a mounting screw 20 therethrough. Although those of ordinary skill in the art may contemplate a multiplicity of grooves, the slide aperture mounting slot 141, in turn, includes a first mounting slot groove 143 and a second mounting slot groove 145 adjacent the first mounting slot groove 143, each defined by the depth 112 of the abutment plate 110 and for clamping against the mounting screw 20. While in engagement with the mounting screw 20, the locking apparatus 1 is rendered, via a ratcheting motion, in either a receiving position, where the first mounting slot groove 143 clamps against the mounting screw 20, or in a locking position, where the second mounting slot groove 145 clamps against the mounting screw 20.

The slide aperture 140 further includes a slide aperture correction slot 147 disposed along the depth 112 and, preferably, along the axis of symmetry 8. Preferably, the slide aperture correction slot 147 and the slide aperture mounting slot 141 each, substantially, share a common position along the axis of symmetry 8, although those of ordinary skill in the art will recognize that the slide aperture correction slot 147 and the slide aperture mounting slot 141 can each be positioned on the locking apparatus 1 at locations different from one another. As shown in FIG. 1, the slide aperture correction slot 147 extends substantially along the length of the abutment plate 110. In effect, the slide aperture 147 facilitates resilient displacement of the abutment plate 110 along the slide aperture 147. This resilient displacement thus enables such ratcheting motion of the mounting screw 20 between the first mounting slot groove 143 and the second mounting slot groove 145.

As shown in FIG. 1, the abutment plate 110 further includes at least one plate contactor notch 150 for clutching at least one component, thereby attaching at least one component to the anchoring component piece 5. In the preferred embodiment, the locking apparatus 1 includes two symmetrically opposing plate contactor notches, 150, a first plate contactor notch 151 and a second plate contactor notch 152, each for locking at least one component to the anchoring component piece 5.

The plate contactor notch 150 is defined by the thickness 112 and, preferably, formed along the edge of the abutment plate 110. Although those of ordinary skill in the art will recognize other suitable positions for placement of the plate contactor notch 150, FIG. 1 preferably shows the first contactor notch 151 positioned near the axis of symmetry 8 and the second contactor notch 152 positioned near the axis of symmetry 8, symmetrically opposing the first plate contactor notch 151.

Additionally, those of ordinary skill in the art will recognize other suitable configurations for clutching at least one component, the preferred plate contactor notch 150 includes a contact head portion 157, a contact ridge portion 156, and a contact hook portion 155, each formed along the depth 112. In the preferred embodiment, the contact ridge portion 156 extends from the contact head portion 157 along the edge of the abutment plate 110 whereas the contact hook portion 155 extends from the contact ridge portion 156.

Figure 4:
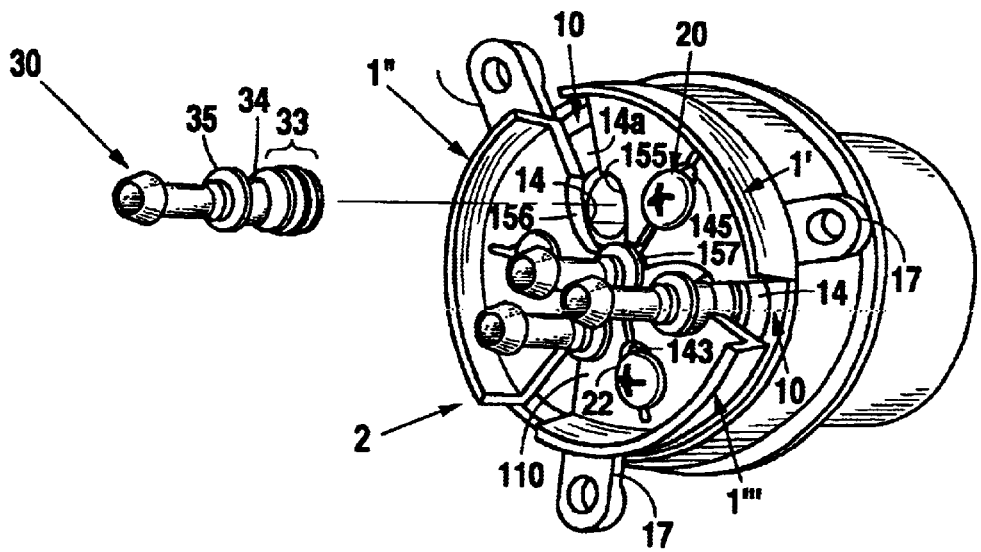
FIG. 4 is a perspective view providing the exemplary illustration of FIG. 3, whereby fittings are secured to a beverage dispenser nozzle via the locking apparatus array.

The contact head portion 157, the contact ridge portion 156, and the contact hook portion 155 each act in combination to form a clutching surface for contact with at least one component thereon. Inasmuch, as the mounting screw 20 is in the receiving position and thus engaged with the first mounting slot groove 143, the plate contactor notch 150 is not utilized. However, as the mounting screw 20 is in the locking position and thus engaged with the second mounting slot groove 145, the contact hook portion 155, the contact ridge portion 156, and the contact head portion 157 engagedly contact at least one component. As described in further detail below, FIGS. 4–5 show the manner by which a plate contactor notch engages with at least one component, illustratively shown as a fitting.

Furthermore, the locking apparatus 1 may include an applicator lip 115 extending outwardly from the abutment plate 110. In the preferred embodiment, the applicator lip 115 and the abutment plate 110 are formed from one piece, a locking bracket piece 100. As such, by facilitating ease of manufacture and replacement thereof, a locking bracket piece 100 is desirably cost effective.

The applicator lip 115 provides a means for enhanced manual engagement with the abutment plate 110, thereby facilitating ease of movement of the abutment plate 115 via manual engagement between the receiving and the locking positions. The applicator lip 115 reinforces the area about the slide aperture correction slot 147, thereby enhancing the resiliency of the abutment plate 110 about the slide aperture 140. Moreover, the applicator lip 115 may be configured for connection with other components. For example, an applicator lip may be so dimensioned for insertion within a slot of a dispensing valve in that a locking apparatus and an associated nozzle anchoring component is coupled with the dispensing valve via the applicator lip 115 of that locking apparatus. In this example, it can also be appreciated that the applicator lip 115 further acts as a splash guard and/or seal, thereby preventing fluid from unfavorably seeping while flowing between the dispensing valve and the nozzle.

Figure 2:
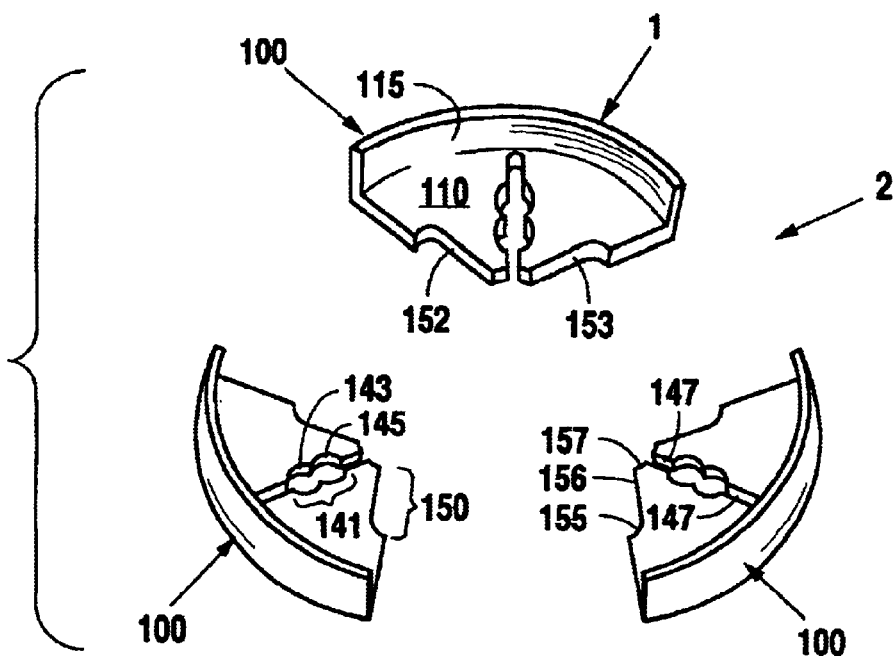
FIG. 2 is a perspective view illustrating a locking apparatus array according to the preferred embodiment for securing at least one component to an anchoring component piece.

FIG. 2 illustrates a locking apparatus array 2 according to the preferred embodiment for clutching at least one component, thereby attaching at least one component to the anchoring component piece 5. The locking apparatus array 2 includes a plurality of plurality of locking apparati 1, each locking apparatus with at least one plate contactor notch.

Preferably, plate contactor notches of the locking apparatus array are configured so that a plate contactor notch from one locking apparatus operatively complements a plate contactor notch from another locking apparatus, thereby enhancing the locking apparatus' 2 grip about each component. Illustratively, as discussed in detail below, FIGS. 4–5 show the locking apparatus array 2 securing four fittings to an anchoring component piece, whereby all four fittings are secured by at least two locking apparati from the locking apparatus array 2 via cooperative engagement of the plate contactor notches thereof.

Figure 3:
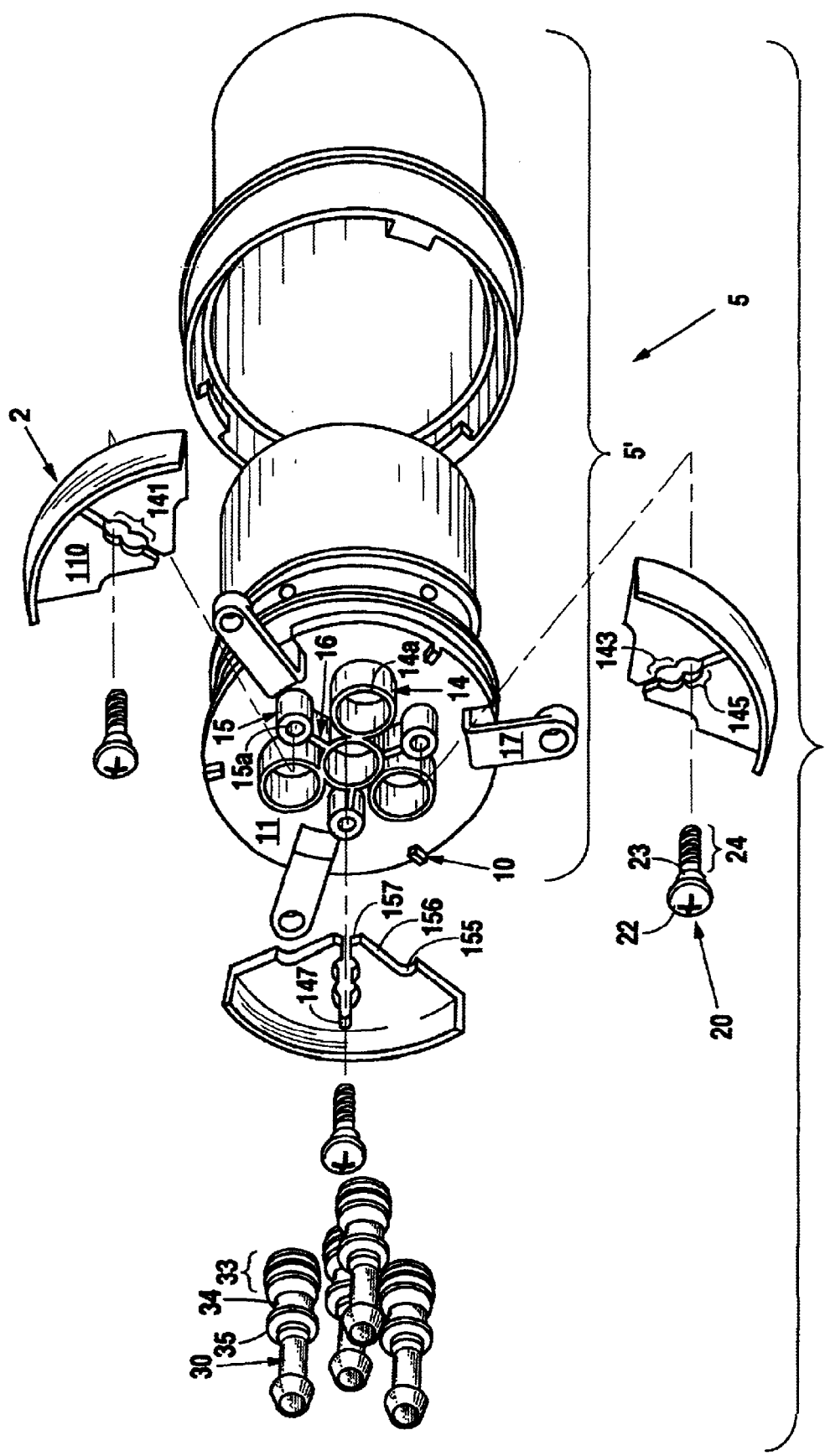
FIG. 3 is an exploded view providing an exemplary illustration of at least one component for attachment to an anchoring component piece via a locking apparatus array, whereby fittings are provided for attachment to a beverage dispenser nozzle assembly, respectively.

FIG. 3 provides an operative example of the locking apparatus array 2, whereby each component comprises a fitting 30 and the anchoring component piece 5 comprises a beverage dispenser nozzle assembly 5'. As such, the beverage dispenser nozzle assembly 5' is linked with a dispensing valve (not shown) having beverage fluid lines (not shown), whereby beverage fluid flows from the beverage fluid lines of dispensing valve, through each fitting 30 linked with each beverage fluid line, across the beverage dispenser nozzle assembly 5', and is discharged therefrom as a desired drink fit for consumption. In this example, the locking apparatus array 2 prevents the beverage fluid lines from pulling out these fittings from the corresponding beverage dispenser nozzle assembly 5'.

In particular, each fitting 30 includes a nozzle connection outlet 33 for connection to the beverage dispenser nozzle assembly 5' and a fitting locking surface 34 adjacent the nozzle connection outlet 33 for engagement with the plate contactor notch 150 of the locking apparatus 1. The fitting 30 may further include a retainment stopper 35 adjacent the fitting locking surface 34 for preventing the locking apparatus 1 from unfavorably traveling beyond the fitting locking surface 34 so that the locking apparatus 1 firmly grips the fitting 30 at the fitting locking surface 34, preferably between the nozzle connection outlet 33 and the retainment stopper 35.

As shown in FIG. 3, the mounting screw 20 includes a head 22 for engagement with the first surface 111, thereby securing the locking apparatus 1 to the beverage dispenser nozzle assembly 5'. The mounting screw 20 includes threads 24 opposing the head 22 and disposed along the mounting screw 20 for engagement with the nozzle dispenser assembly 5'. The mounting screw 20 may further include a mounting screw locking surface 23 interposed with the head 22 and the threads 24 for engagement with the slide aperture 141 of the locking apparatus 1, thereby facilitating ease of movement between the first mounting slot groove 143 and the second mounting slot groove 145.

The beverage dispenser nozzle assembly 5' includes an anchoring component interface element 10 for engagement with each locking apparatus of the locking apparatus array 2. The anchoring component interface element 10 includes a mounting screw boss 15 extending outwardly from the anchoring component interface element 10 for threadly receiving the corresponding mounting screw 30 such that the locking apparatus 1 is secured between the mounting screw 30 and the mounting screw boss 15. A mounting screw contactor surface 15a is provided by the mounting screw boss 15 for engagedly contacting the second surface 113 of the locking apparatus 1, thereby supporting the locking apparatus 1.

Similarly, the anchoring component interface element 10 includes a fitting/nozzle boss 14 extending outwardly from the anchoring component interface element 10 for receiving the corresponding fitting 30 such that the nozzle connection outlet 33 of the fitting 30 is secured within and in communication with the fitting/nozzle boss 14. A fitting/nozzle boss contactor surface 14a is provided by the fitting/nozzle boss 14 for engagedly contacting the second surface 113, thereby supporting the locking apparatus 1.

Moreover, the anchoring component interface element 10 may include a guide rib 16 extending outwardly from the anchoring interface element 10 for engagement with the slide aperture correction slot 147. Specifically, in the preferred embodiment, the guide rib 16 wedges against the slide aperture correction slot 147, thereby fixing the position of the slide aperture mounting slot 141 with respect to the anchoring component interface element 10 to, thus, favorably accommodate movement of the head 22 of the mounting screw 20 between the first mounting slot groove 143 and the second mounting slot groove 145. As such, the guide rib 15 prevents unfavorable rotation of the locking apparatus 1 about the mounting screw 20. Furthermore, the example in FIG. 3, the anchoring component interface element 10 may also include at least one nozzle mounting bracket 17 extending from the anchoring component interface element 10 for securing the beverage dispenser nozzle assembly 5' to a dispensing valve.

FIGS. 4–5 provide an example where the locking apparatus array 2 is in operative engagement with the beverage dispenser nozzle assembly 5' of FIG. 3, whereby four fittings are secured by at least two locking apparati from the locking apparatus array 2 via cooperative engagement of plate contactor notches thereof. Accordingly, the locking apparatus array 2 includes a first locking apparatus 1', a second locking apparatus 1" for engagement with the first locking apparatus 1', and a third locking apparatus 1'" for engagement with the first locking apparatus 1' and/or the second locking apparatus 1".

Particularly, in FIG. 4, the second and the third locking apparati 1", 1'" are each in the locking position and in cooperative engagement with one another whereas the first locking apparatus 1' is in the receiving position. In the locking position, the second and the third locking apparati 1", 1'" may each clutch up to four fittings, thereby securing each fitting to the beverage dispenser nozzle assembly 5'. As such, for each plate contactor notch 150 shown in FIG. 4, the contact head portion 157 may clutch a fitting positioned at the center (hereinafter referred to in this example as a "central fitting") and the contact ridge as well as contact hook portions may clutch another fitting positioned radially outward from the center of the beverage dispenser nozzle assembly 5'(hereinafter referred to in this example as a "radial fitting").

Therefore, a radial fitting is optimally clutched between a second contactor notch of one locking apparatus and a first contactor notch of another locking apparatus. For this example of FIG. 4, a radial fitting is optimally gripped between a second contactor notch 152 of the second locking apparatus 1" and a first contactor notch 151 of the third locking apparatus 1'". It should be emphasized, however, that a radial fitting can be sufficiently secured to the beverage dispenser nozzle assembly 5' by one contactor notch from an individual locking apparatus.

Similarly, a central fitting is optimally clutched by a contact head portion from each plate contactor notch 150 of the first, second, and third locking apparati 1', 1", 1'". It should be emphasized, however, that a central fitting can be sufficiently secured to the beverage dispenser nozzle assembly 5' by one contact head portion from an individual locking apparatus.

In this manner, for the example of FIG. 4, two locking apparati in cooperative engagement with one another in the locking position can sufficiently clutch four fittings, thereby securing these four fittings to the beverage dispenser nozzle assembly 5'. Inasmuch, the entire locking apparatus array 2 in the locking position optimally attaches these four fittings to the beverage dispenser nozzle assembly 5'. Those of ordinary skill in the art will recognize other embodiments for the locking apparatus array 2 and associated configurations for securing at least one component to an anchoring component piece 5 so long as at least one plate contactor notch 150 is employed.

Figure 5A:
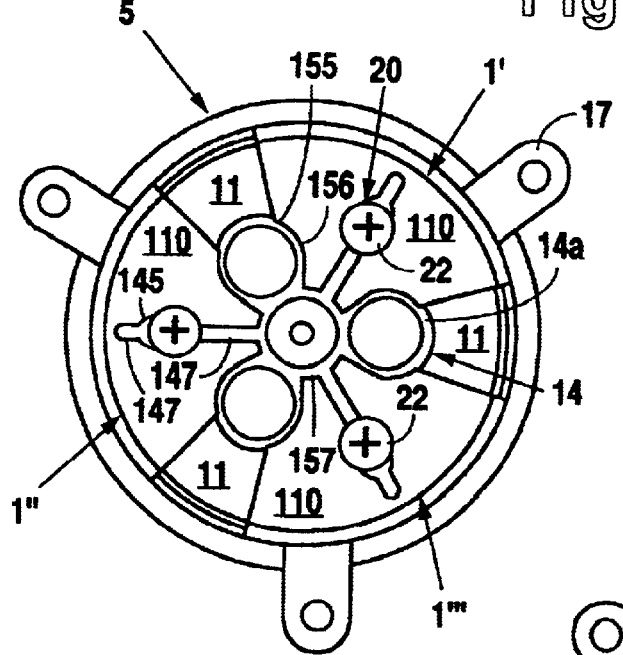
FIG. 5a shows each locking apparatus in a receiving position for receiving at least one fitting within the anchoring component piece.

FIG. 5 illustrates the preferred manner for securing at least one component to the anchoring component piece 5 via at the locking apparatus array 2. As such, in FIG. 5a, the locking apparatus array 2 is in a receiving position so that the anchoring component piece 5 may receive at least one component, such as a port or a fitting, via a corresponding fitting/nozzle boss 14. In particular, a mounting screw is engaged with the first mounting slot groove 143 of the first, second, and third locking apparati 1', 1", 1'", thereby allowing insertion of at least one component piece without obstruction from the first, second, and third locking apparati 1', 1", 1'".

Figure 5B:
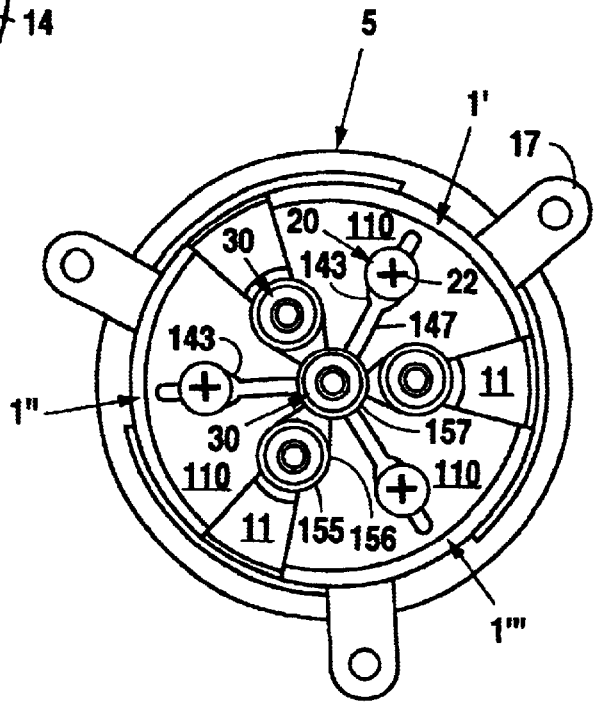
FIG. 5b shows each locking apparatus in a locking position for securing at least one fitting to the anchoring component piece.

FIG. 5b shows the locking apparatus array 2 in a locking position for securing at least one component to the anchoring component piece 5. A mounting screw is thus engaged with the second mounting slot groove 145 of the first, second, and third locking apparati 1', 1", 1'", thereby allowing these apparati to clutch at least one component piece in a manner described above.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims that follow.

I claim:

1. A locking apparatus for securing a component to an anchoring component piece, comprising:
   an abutment plate for contact with the anchoring component piece;
   a slide aperture disposed on said abutment plate, said slide aperture including:
      a slide aperture mounting slot for receiving a fastener that attaches said abutment plate to the anchoring component piece,
      a first mounting slot groove for clamping against the fastener, thereby rendering the locking apparatus in a receiving position for facilitating linking of the component with the anchoring component piece, and
      a second mounting slot groove adjacent said first mounting slot groove for clamping against the fastener, thereby rendering the locking apparatus in a locking position for facilitating attachment of the component with the anchoring component piece; and
   a plate contactor notch disposed on said abutment plate for contact with the component, whereby the component is secured to the anchoring component piece via said plate contactor notch.

2. The locking apparatus according to claim 1 wherein said plate contactor notch includes:
   a clutching surface for contact with the component thereon, thereby securing the component to the anchoring component piece.

3. The locking apparatus according to claim 1 wherein said plate contactor notch includes:
   a clutching surface for contact with a plurality of components thereon, thereby securing the plurality of components to the anchoring component piece.

4. The locking apparatus according to claim 3 wherein said clutching surface is formed by:
   a contact head portion;
   a contact ridge portion extending from the contact head portion; and
   a contact hook portion extending from the contact ridge portion.

5. The locking apparatus according to claim 1 wherein said slide aperture includes:
   a slide aperture correction slot extending substantially along said abutment plate for facilitating resilient displacement of said abutment plate along the slide aperture.

6. The locking apparatus according to claim 5 further comprising an applicator lip extending outwardly from said abutment plate wherein said applicator lip reinforces the area about said slide aperture correction slot, thereby enhancing resiliency of the abutment plate at the slide aperture.

7. The locking apparatus according to claim 1 wherein said slide aperture mounting slot facilitates variable positioning of said abutment plate with respect to the anchoring component piece via a ratcheting motion between said first mounting slot groove and said second mounting slot groove.

8. The locking apparatus according to claim 1, further comprising:
   an applicator lip extending outwardly from said abutment plate.

9. The locking apparatus according to claim 8 wherein said applicator lip facilitates ease of movement of said abutment plate.

10. The locking apparatus according to claim 8 wherein said applicator lip is configured for linking the anchoring component piece with another component piece.

11. The locking apparatus according to claim 1 wherein the component comprises a fitting.

12. The locking apparatus according to claim 1 wherein the anchoring component piece comprises a beverage dispenser nozzle assembly.

13. A locking apparatus array for securing a component to an anchoring component piece, comprising:
   a first locking apparatus;
   a second locking apparatus;
   each of said first and second locking apparatus, comprising:

an abutment plate for contact with the anchoring component piece, a slide aperture disposed on said abutment plate, said slide aperture including:

a slide aperture mounting slot for receiving a fastener that attaches said abutment plate to the anchoring component piece, a first mounting slot groove for clamping against the fastener, thereby rendering the locking apparatus in a receiving position for facilitating linking of the component with the anchoring component piece, and a second mounting slot groove adjacent said first mounting slot groove for clamping against the fastener, thereby rendering the locking apparatus in a locking position for facilitating attachment of the component with the anchoring component piece, and a plate contactor notch disposed on said abutment plate for contact with the component, whereby the component is secured to the anchoring component piece via said plate contactor notch.

14. The locking apparatus array according to claim 13 wherein said plate contactor notch includes:

a clutching surface for contact with the component thereon, thereby securing the component to the anchoring component piece.

15. The locking apparatus array according to claim 14 wherein said clutching surface is formed by:

a contact head portion;

a contact ridge portion extending from the contact head portion; and a contact hook portion extending from the contact ridge portion.

16. The locking apparatus array according to claim 13 wherein said plate contactor notch includes:

a clutching surface for contact with a plurality of components thereon, thereby securing the plurality of components to the anchoring component piece.

17. The locking apparatus array according to claim 13 wherein said slide aperture includes:

a slide aperture correction slot extending substantially along said abutment plate, for facilitating resilient displacement of said abutment plate along the slide aperture.

18. The locking apparatus according to claim 17 further comprising an applicator lip extending outwardly from said abutment plate wherein said applicator lip reinforces the area about said slide aperture correction slot, thereby enhancing resiliency of the abutment plate at the slide aperture.

19. The locking apparatus array according to claim 17 wherein the anchoring component piece includes an anchoring component interface element for engagement with each locking apparatus of the locking apparatus array, whereby the anchoring component interface element includes:

a guide rib extending outwardly from the anchoring component interface element and in engagement with said slide aperture correction slot for fixing the position of said slide aperture mounting slot with respect to the anchoring component interface element.

20. The locking apparatus according to claim 17 wherein said slide aperture mounting slot facilitates variable positioning of said abutment plate of each locking apparatus with respect to the anchoring component piece via a ratcheting motion between said first mounting slot groove and said second mounting slot groove.

21. The locking apparatus array according to claim 13 wherein each locking apparatus further includes:

an applicator lip extending outwardly from said abutment plate.

22. The locking apparatus array according to claim 21 wherein said applicator lip facilitates ease of movement of said abutment plate.

23. The locking apparatus array according to claim 21 wherein said applicator lip is configured for linking the anchoring component piece with another component piece.

24. The locking apparatus array according to claim 13 wherein said plate contactor notch of said first locking apparatus in a locking position and the plate contactor notch of said second locking apparatus in a locking position are in cooperative engagement with one another such that the component is secured to the anchoring component piece.

25. The locking apparatus array according to claim 13 wherein said plate contactor notch of said first locking apparatus in a locking position and said plate contactor notch of said second locking apparatus in a locking position are in cooperative engagement with one another such that a plurality of components are secured to the anchoring component piece.

26. The locking apparatus array according to claim 13 further comprising:

a third locking apparatus for engagement with said first locking apparatus.

27. The locking apparatus array according to claim 26 further comprising:

a third locking apparatus for engagement with said second locking apparatus.

28. The locking apparatus array according to claim 27 wherein said plate contactor notch of said first locking apparatus in a locking apparatus, said plate contactor notch of said second locking apparatus in a locking position, and the plate contactor notch of said third locking apparatus in a locking position are in cooperative engagement with one another such that the component is secured to the anchoring component piece.

29. The locking apparatus array according to claim 27 wherein said plate contactor notch of the first locking apparatus in a locking position, said plate contactor notch of the second locking apparatus in a locking position, and the plate contactor notch of said third locking apparatus in a locking position are in cooperative engagement with one another such that a plurality of components are secured to the anchoring component piece.

30. The locking apparatus array according to claim 13 wherein the anchoring component piece includes:

an anchoring component interface element for engagement with each locking apparatus of the locking apparatus array.

31. The locking apparatus array according to claim 30 wherein the anchoring component interface element includes:

a mounting screw boss extending outwardly from said anchoring component interface element for receiving the mounting screw to secure said locking apparatus to the anchoring component piece.

32. The locking apparatus array according to claim 30 wherein the anchoring component interface element includes:
　a fitting boss extending outwardly from said anchoring component interface element for receiving the component to secure the component to the anchoring component piece.

33. A method for securing a component to an anchoring component piece, comprising the steps of:
　providing locking apparatus, comprising:
　　an abutment plate for contact with the anchoring component piece,
　　a slide aperture disposed on said abutment plate for facilitating attachment of said abutment plate to the anchoring component piece, and
　　a plate contactor notch disposed on said abutment plate for contact with the component,
　whereby the component is secured to the anchoring component piece via said plate contactor notch;
　connecting said locking apparatus to the anchoring component piece;
　rendering said locking apparatus in a receiving position;
　linking the component with the anchoring component piece;
　rendering said locking apparatus in a locking position; and
　securing the component to the anchoring component piece via said locking apparatus in the locking position.

34. The method according to claim 33 wherein the step of linking the component with the anchoring component piece comprises the step of:
　linking another component with the anchoring component piece so that a plurality of components may be secured to the anchoring component piece via said locking apparatus in the locking position.

35. A method for securing a component to an anchoring component piece, comprising the steps of:
　providing first and second locking apparatus, comprising:
　　an abutment plate for contact with the anchoring component piece,
　　a slide aperture disposed on said abutment plate for facilitating attachment of said abutment plate to the anchoring component piece, and
　　a plate contactor notch disposed on said abutment plate for contact with the component,
　whereby the component is secured to the anchoring component piece via said plate contactor notch;
　connecting said first locking apparatus to the anchoring component piece;
　connecting said second locking apparatus to the anchoring component piece;
　rendering said first locking apparatus in a receiving position;
　rendering said second locking apparatus in a receiving position;
　linking the component with the anchoring component piece;
　rendering said first locking apparatus in a locking position;
　rendering said second locking apparatus in a locking position; and
　securing the component to the anchoring component piece via said first and second locking apparatus in the locking position and in cooperative engagement with one another.

36. The method according to claim 35 wherein the step of linking the component with the anchoring component piece comprises the step of:
　linking another component with the anchoring component piece so that a plurality of components may be secured to the anchoring component piece via said first and second locking apparatus, each in the locking position.

\* \* \* \* \*